United States Patent

[11] 3,585,970

[72] Inventors Robert A. Scott
R.F.D. 5;
Richard R. Reese, 535 Baltimore Blvd.;
David A. Scott, 257 W. Main St., all of
Westminster, Md. 21157
[21] Appl. No. 841,168
[22] Filed Apr. 9, 1969
Division of Ser. No. 710,503, Mar. 5, 1968,
Pat. No. 3,476,087, which is a continuation-
in-part of application Ser. No. 647,286,
May 11, 1967, now Patent No. 3,485,215.
[45] Patented June 22, 1971

[54] FEEDING DEVICE
4 Claims, 19 Drawing Figs.
[52] U.S. Cl. .................................................. 119/53
[51] Int. Cl. ............................................. A01k 05/00

[50] Field of Search ............................................ 119/53, 52

[56] References Cited
UNITED STATES PATENTS
2,884,899   5/1959   Jackes et al. ................... 119/53
3,230,933   1/1966   Myers et al. ................... 119/53
3,388,690   6/1968   Hostefler ....................... 119/53

Primary Examiner—Hugh R. Chamblee
Attorney—Edwin E. Greigg

ABSTRACT: A feeding device having a supply hopper connected to a feed line conveyor of the axially expanding helical auger type. A suspension system including load dividing floor supports for adjustably supporting the device with respect to the ground, and in addition, the feed line is provided with a plurality of spaced feeding stations in the form of feeding pans each having an adjustable feed flow.

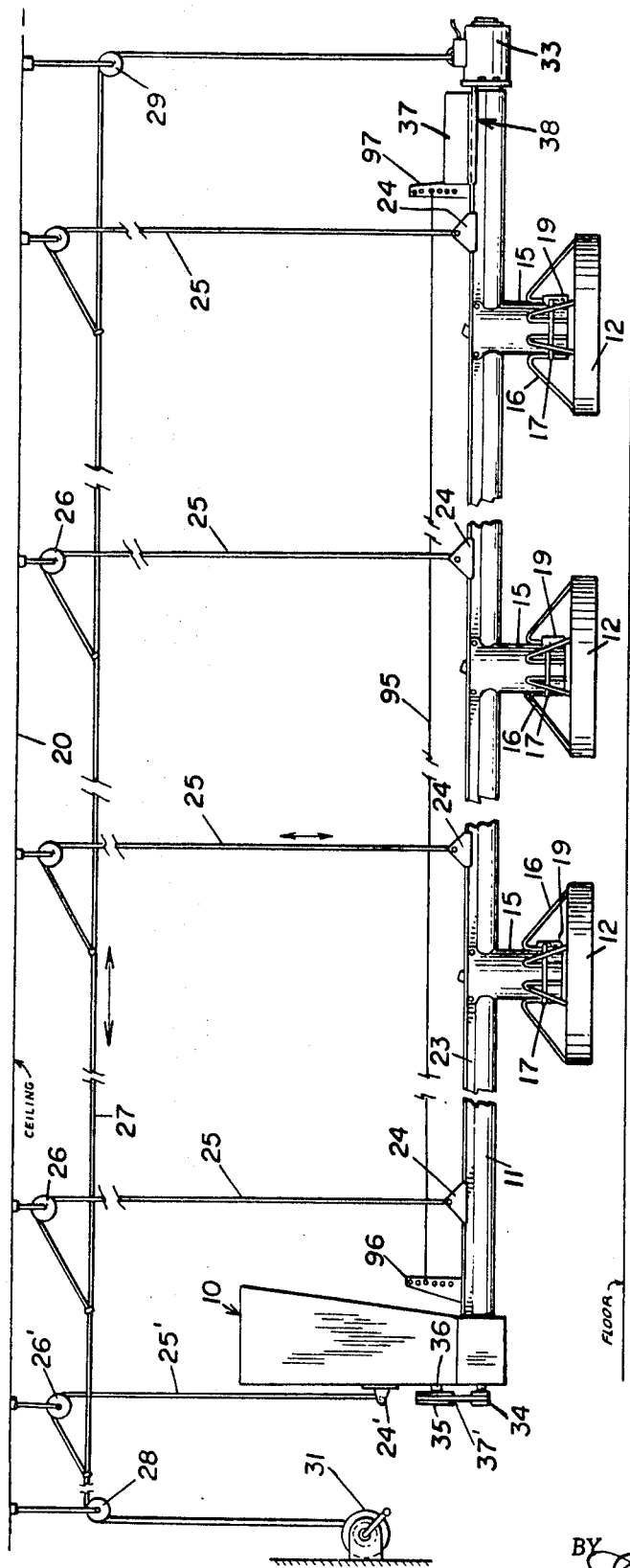
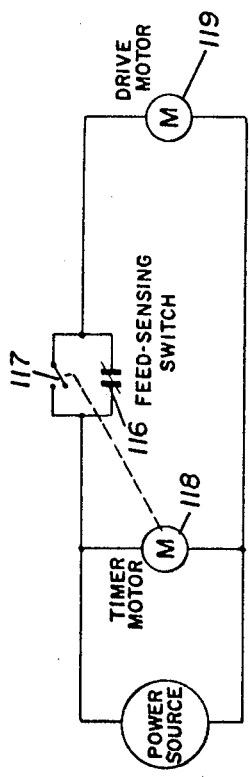
Fig. 1.
Fig. 11.
INVENTORS
Robert A. Scott
Richard R. Reese
David A. Scott INVENTORS
Robert A. Scott
Richard R. Reese
David A. Scott BY Edwin E. Greigg
ATTORNEY

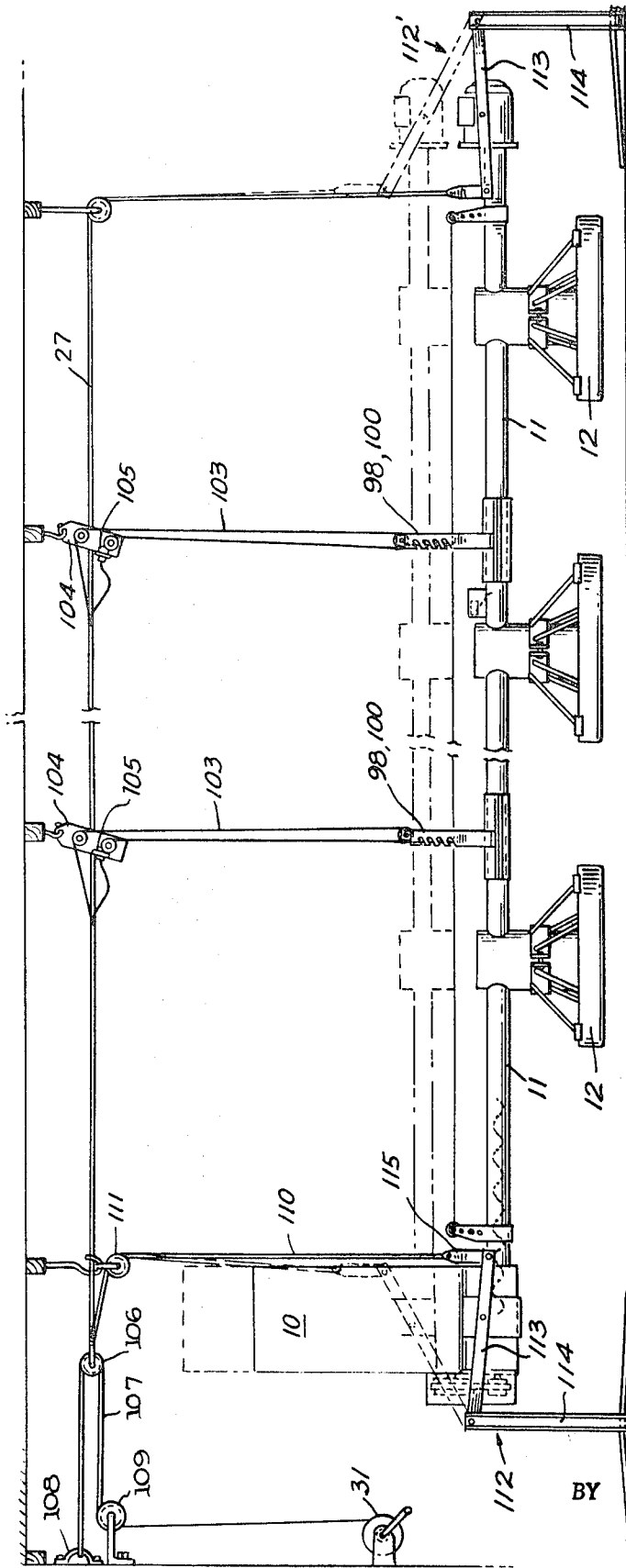
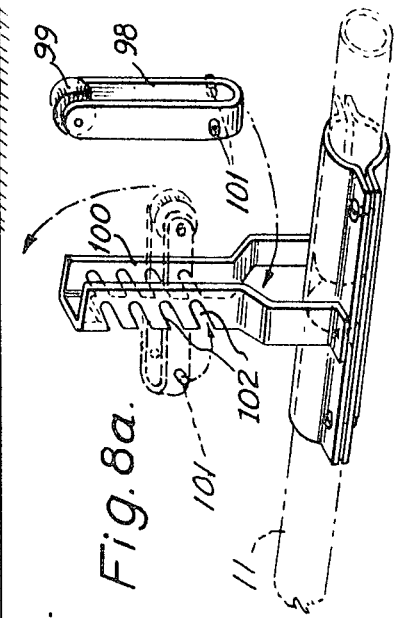
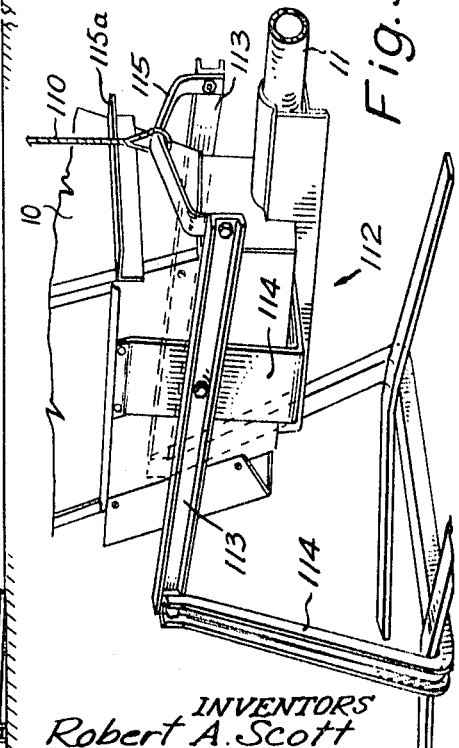
Fig. 8.
Fig. 8a.
Fig. 9.
INVENTORS
Robert A. Scott
Richard R. Reese
David A. Scott

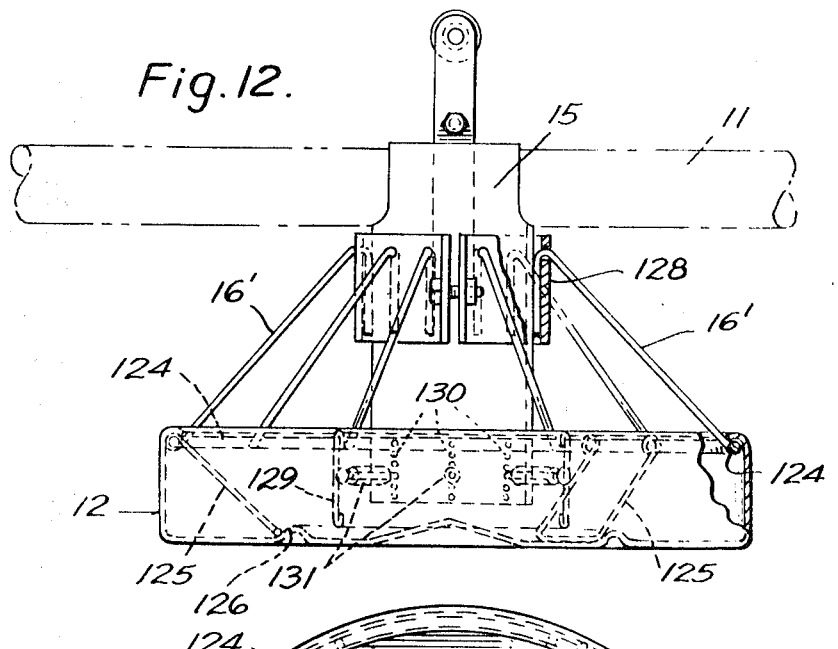
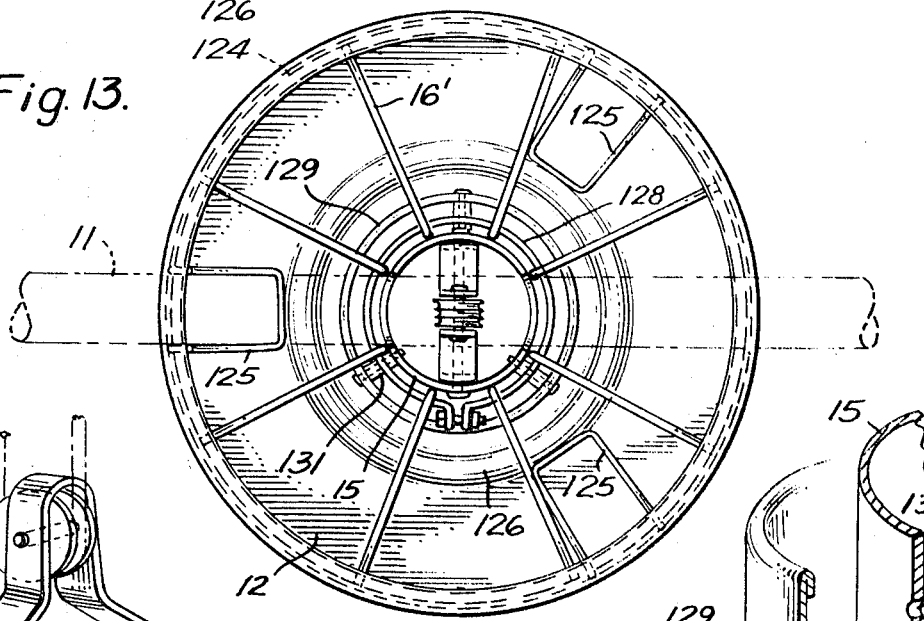
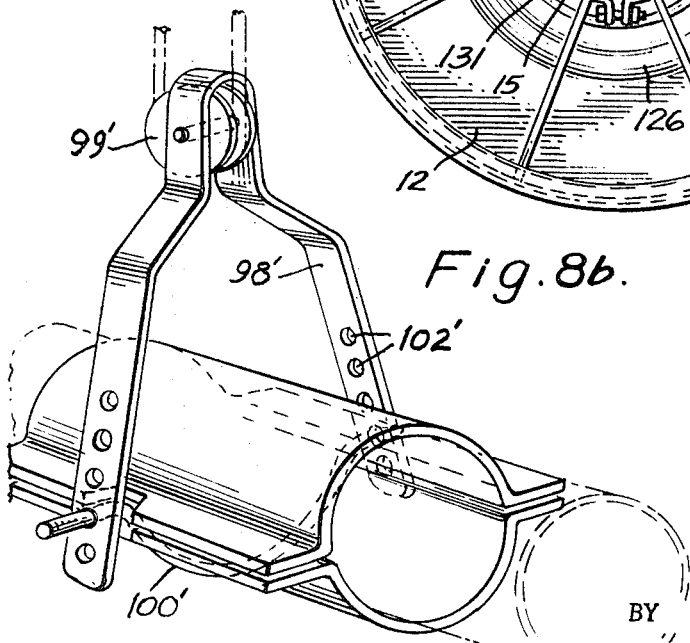
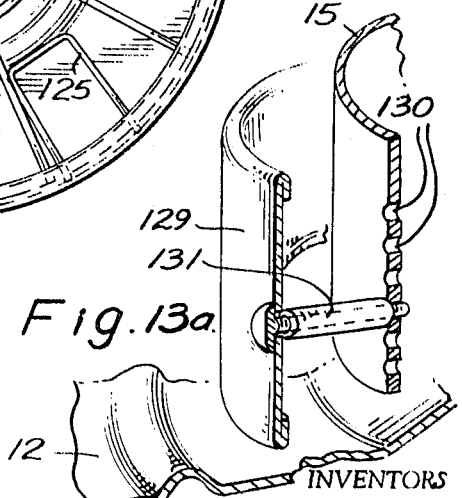

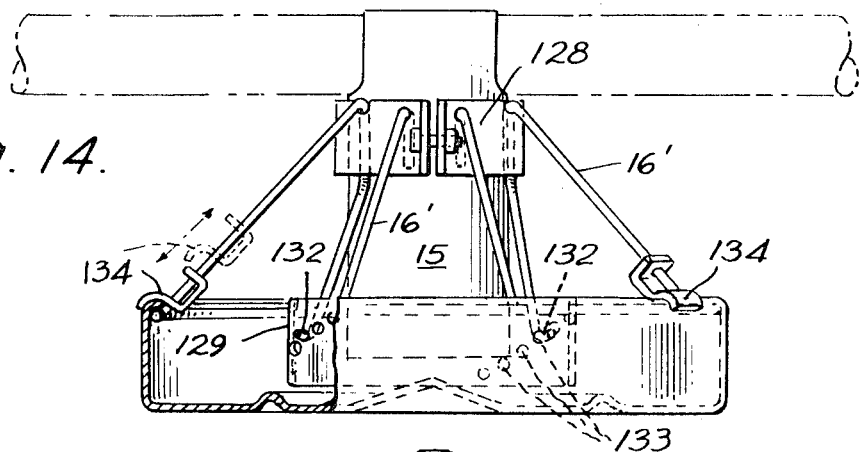
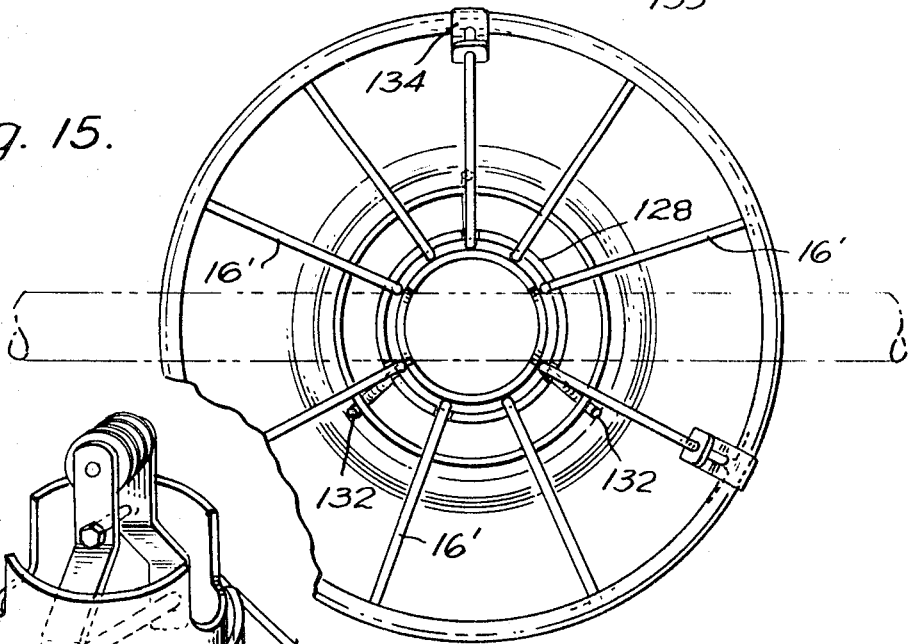
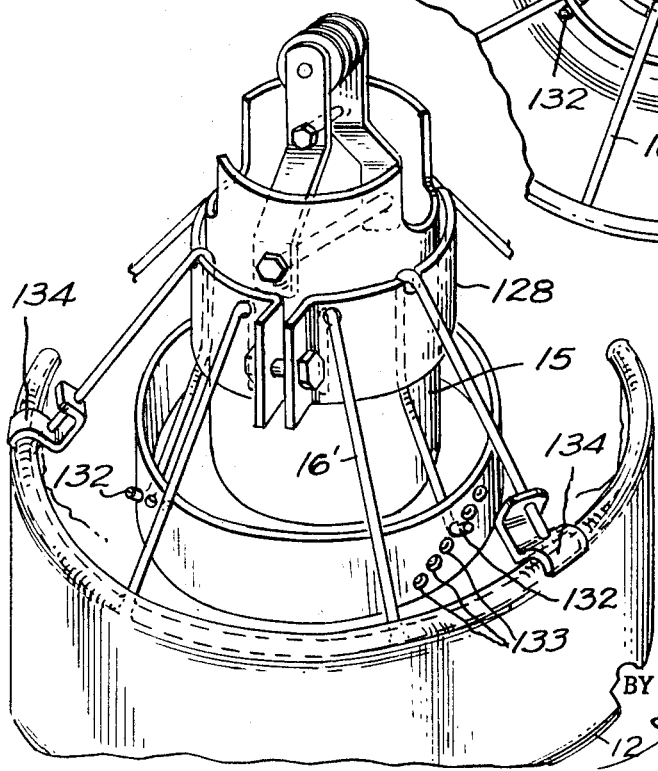
INVENTORS
Robert A. Scott
Richard R. Reese
David A. Scott
BY
ATTORNEY

FEEDING DEVICE

This application is a divisional application of Ser. No. 710,503, filed Mar. 5, 1968, now U.S. Pat. No. 3,476,087, entitled "Feeding Device," which is a continuation-in-part application of Ser. No. 647,286, filed May 11, 1967, now U.S. Pat. No. 3,485,215.

The present invention relates generally to feeding devices and more particularly to an automatic poultry feeder for distributing feed to a plurality of feed stations.

One of the most persistent problems facing poultry farmers is the controlling of distribution of feed in a manner which would provide a continuous supply of fresh, clean feed of uniform mixtures to all areas of a poultry house and which would insure that the birds will consume the complete ration as mixed without picking out the preferred feed material. In this regard, chain and trough-type feeders in which the feed material is moved along the trough from a main hopper have generally been found to be inadequate.

In chain and trough-type feeders in which the feed material is distributed from a main hopper along an open trough extending the length of the poultry house, the birds rush to the supply end of the feed as the feeding process is initiated and the resulting crowding often results in injuries to the birds. Further, the birds eating from the trough closest to the supply end consume the feed particles of their choice, leaving the picked over material, generally of lesser nutritional value, for the birds eating further away from the supply end.

Attempts to overcome these problems have led to the development of a variety of mechanical poultry feeders such as shown, for example, in U.S. Reissue Pat. No. 25,589. In this patent, the poultry feeder includes a main feed hopper having a feed line connected thereto with an internally positioned, open center, motor driven auger helix. The feed line is provided with a plurality of spaced openings below which are supported feed pans so that as the auger is driven, the feed is carried along the feed line and falls through the spaced openings into the feed pan. This arrangement does not have the versatility of the mechanism to be disclosed herein and does not teach occasional feeding of the birds since in the prior device feed is deposited successively in the feed pans as the feed is conveyed along the conveyor and thus does not overcome the problem of bird crowding at the supply end of the conveyor since the feeding station nearest the hopper always receives a full supply of feed first. Further, the new improvements to be disclosed herein provide an on-off switch which is not dependent upon the birds eating from a control station. Moreover, a further advantage of the new feeder contemplates a combination ceiling and floor supporting means which is particularly desirable since such an arrangement relieves stress from the overhead support means when the device is full of feed.

These and other disadvantages of prior art feeding devices are overcome by the present invention which has as its primary object of one of the embodiments the provision of an improved feeder which will provide fresh clean feed of uniform mixtures to all feeding stations or areas along the length of the feeder, and which will make feed available to the birds at all feeding stations in the poultry house at the same time.

Another object of the present invention is to provide an improved feeder for distributing equal quantities of feed to a plurality of feed stations simultaneously.

A further object of the present invention is to provide an improved feeder wherein the total amount of feed delivered to each feeder station is regulated.

Yet another object of the present invention is to provide in an embodiment an improved feeder wherein the feed material is conveyed to a plurality of feeding stations without being exposed to the birds until all feed stations are ready to be filled.

Still another object of the present invention is to provide in one of the embodiments an automatic feed conveyor for distributing equal quantities of feed material to a plurality of feed stations at timed intervals.

To this end, the feeding device of the present invention comprises a feed hopper connected to a feed supply line which extends horizontally therefrom and supports a conveying means such as, for example, an open center axially expandable helical auger. The feed supply line is provided with a plurality of openings at selective intervals and below each opening is supported a feeding pan. Each opening is maintained closed as the feed is being carried by the conveying means through the feed supply line away from the feed hopper, but is open when the direction of movement of the conveying means is reversed.

In accordance with one feature of the invention, the conveying means is an open center helical auger which is driven in one direction for conveying feed along the feed supply line prior to distribution to the several feed stations and in the reverse direction for distributing the feed to the several feed stations, the movement of the auger in the second direction serving to open the feed supply line at the several feed stations, and movement of the auger in the first direction serving to close the feed supply to the several feed stations.

In accordance with another feature of the invention, the feed supply line is provided with a switch responsive to the feed input from the hopper so as to cause the helical auger to stop automatically before reversing its direction to effect distribution of the feed to the feed stations. Advantageously, the switch may be connected as part of a timing circuit to cause the feed to be distributed to the feeding stations at predetermined intervals.

Other features and advantages of the present invention will become apparent from the following description taken in connection with the accompanying drawings; however, it is to be expressly understood that these drawings are for the purpose of illustration only and are not intended to represent the full scope of the invention which is defined by the appended claims.

In the drawings, wherein like characters refer to like parts throughout the several views:

FIG. 1 is a side elevational view of a feed supply device embodying the present invention;

FIGS. 8 and 8a are elevational views of an alternate embodiment of the present invention illustrating load dividing floor supports;

FIG. 8b is a perspective view of an alternate embodiment of the bracket support for the feed line;

FIG. 9 is an elevational view, partly in cross section, of the load dividing floor supports shown in FIG. 8;

FIG. 11 is a diagrammatical schematic illustration of a control circuit for energizing the programming timer;

FIG. 12 is an elevational view of another embodiment of the feed station;

FIG. 13 is a plan view of the feed station illustrated in FIG. 12;

FIG. 13a is a partial perspective view of the feed station illustrated in FIG. 12;

FIG. 14 is an elevational view of yet another embodiment of the feed station;

FIG. 15 is a plan view of the feed station illustrated in FIG. 14; and

FIG. 16 is a partial perspective view of the feed station illustrated in FIG. 14.

Figure 2:
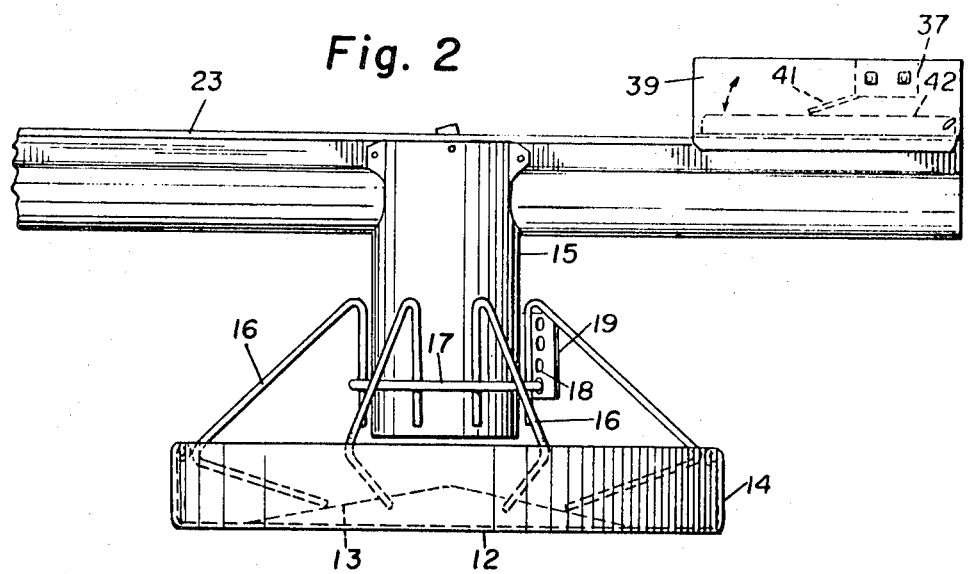
FIG. 2 is a fragmentary, side elevational view of the last feed station shown in FIG. 1.

Referring now to the drawings, and in particular to FIG. 1, there is generally indicated at 10 a feed hopper from which feed is conveyed to a horizontally disposed feed line 11 arranged to extend along the length of a poultry house. Feed hopper 10 may be positioned within the feed room of the poultry house or may be located in an adjacent room, in which case feed line 11 necessarily extends through the separating wall (not shown). The latter arrangement is particularly advantageous since it permits loading of the feed hopper 10 without the annoyance of having the birds flocking around the feed hopper as it is being filled.

Spaced at fixed intervals along the feed line 11 and supported beneath the feed line are a plurality of feed pans 12 which form individual feeding stations for the birds. As more clearly shown in FIGS. 2 and 3, each feed pan 12 is circular in shape and has a centrally raised base portion 13, preferably conical in shape, to facilitate diffusion of the feed against the sidewall 14 of the feed pan.

Figure 3:
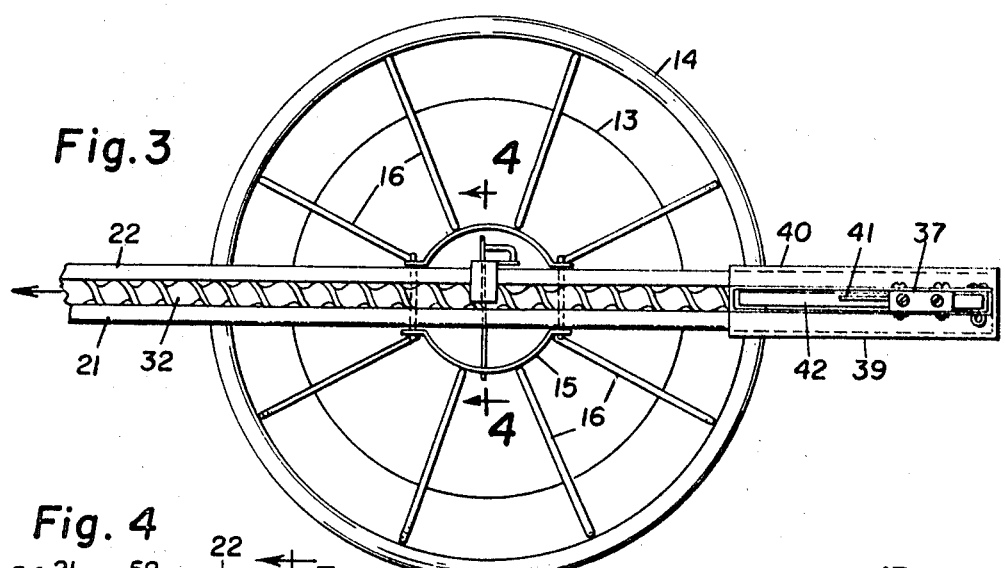
FIG. 3 is plan view of the feed station illustrated in FIG. 2.

Each feed pan 12 is supported beneath an opening in the feed line 11 at each feed station by a hollow, vertically disposed feed guide 15 conveniently attached at its upper end to feed line 11. For supporting the feed pan to the feed line, a plurality of spaced rod members 16 may be used as shown in FIG. 2. This arrangement prevents the birds from climbing into the feed pan, while allowing feed to be extracted therefrom. Rod members 16 are affixed at opposite ends between the feed pan 12 and the feed guide 15. Conveniently, one end of each rod member 16 may be bent downwardly to bear against the feed guide 15, and a circular rod member 17 may be positioned over the bent end portions of each rod member and positioned in one of a plurality of spaced openings 18 provided in a vertical plate 19 attached to the outside surface of the feed guide 15.

In this manner, the feed pan 12 may be spaced from the bottom of the feed guide 15 at suitable distances which is particularly desirable when feeding chicks. With the rod member 17 positioned in the uppermost opening 18, the feed pan 12 is disposed closely adjacent the bottom of the feed guide 15 and prevents any chicks which might make their way into the feed pan from getting hung-up and injured within the guide. It should be apparent that the feed pans may be of any desired form or if desired, as a matter of economy, the feed pans may be dispensed with entirely.

Referring again to FIG. 1, the entire feed system may be suspended from the ceiling 20 of the poultry house. To this end, the feed line 11 comprises a lower section which is generally circular in cross section and a vertically extending upper section bent outwardly at right angles forming spaced top pieces 21 and 22, as more clearly shown in FIG. 6, to provide a trackway 23. Affixed to the trackway 23 at spaced intervals are supporting plates 24. Each supporting plate has connected thereto a line 25 which passes over and around a pulley 26 suspended from the ceiling 20. Each line 25 is connected to a common line 27 which passes over a pair of pulleys 28 and 29, also suspended from the ceiling, and is affixed at one end to motor 33 at one end of feed line 11. The other end of feed line 11 is supported through line 25' secured to plate 24' on hopper 10. Line 25' passes over and around pulley 26' suspended from the ceiling and is connected to line 27 in a manner similar to that of line 25. The other end of line 27 is tied to a winch 31, or the like, so as to enable the entire assembly to be lifted from a point relatively close to the floor to a point adjacent the ceiling. The advantages of such an arrangement which permits adjustment of the height of the feed pans and the clearing of the entire floor area should be readily apparent.

To distribute feed to the several feeding stations, feed line 11 supports therein an open center, axially expandable helical auger 32 which is driven at one end by a reversible motor 33 supported to the end of the feed line. Helical auger 32 is supported at opposite ends in a conventional manner by a bearing (not shown), while opposite ends of auger shaft extend through the closed ends of the feed line 11 for driving connection to the motor and the feed hopper assembly.

Advantageously, the driven end of the helical auger 32 is connected to a driving pulley 34 which drives pulley 35 secured to shaft 36 which is journaled in feed hopper 10. Driving connection is established by belt 37'. Shaft 36 is, in turn, connected to an agitator or stirrer (not shown) within the feed hopper 10 to facilitate mixing or agitation of the feed therein and distribution to the feed line 11. The feed hopper assembly may include a conventional one-way clutch (not shown) between the helical auger 32 and the shaft of drive pulley 34 to preclude operation when the drive to the helical auger is reversed.

In operation, upon energization of the motor 33, the helical auger 32 is driven in a direction to cause feed from the feed hopper 10 to be conveyed along the feed line 11 to the several feeding stations. However, to prevent the feed from passing through the opening in the feed line at each feeding station, there is provided a valve cooperating with the auger, in a manner to be hereinafter described, which prevents distribution of feed to each feed station until the feed line contains a normal load, after which all feeding stations are filled simultaneously.

In accordance with the present invention, there is provided a feed sensing switch 37 positioned along the feed line trackway 23, preferably at a selected distance past a selected feeding station which maybe the last feeding station, as at 38. Feed sensing switch 37 is a conventional microswitch or mercury switch or any other type of a kick switch mounted between a pair of spaced plate members 39 and 40 adapted to ride on trackway 23, and is arranged to be actuated upon a buildup of feed in the feed line 11. To this end, switch 37 has its spring biased operating arm 41 bearing against a movable actuating plate 42 adapted to be raised by the level of feed in the feed line 11 when the section of the feed line under the actuating plate carries enough feed.

The feed sensing switch 37 is connected in the energizing control circuit for the motor 33 so that upon actuation of this switch, the motor 33 can be driven in a direction to reverse the direction of drive to the helical auger 32. Upon reversal of the direction of drive to the helical auger, each valve at each feeding station is actuated simultaneously to cause all feed pans 12 to receive feed.

The amount of feed which falls from each opening is equal to the amount which was carried by the helical auger 32 between that opening and the next upstream opening. Thus, not only is the feed delivered to the feed pans simultaneously, but it is delivered in equal amounts. Since the quantity of feed that a feed pan can hold and the amount of feed carried per length of feed line can be easily measured, the feeding stations are conveniently spaced along the feed line to prevent spillover.

Figure 4:
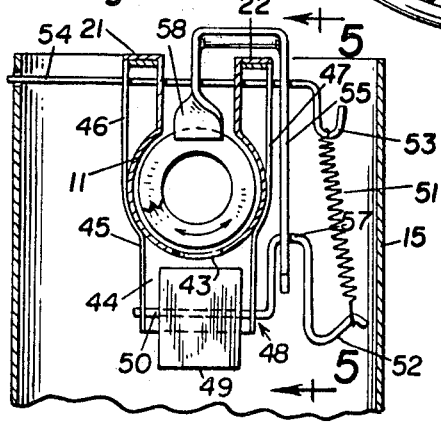
FIG. 4 is a view taken along lines 4-4 of FIG. 3 illustrating the feed valve in its open position.
Figure 5:
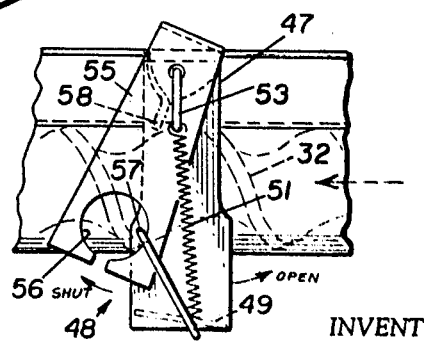
FIG. 5 is a view taken along lines 5-5 of FIG. 4 illustrating the feed valve in its closed position.

Referring to FIGS. 4 and 5, there is illustrated one form of valve, suitable for use in the present invention for delivering feed to a feed station in response to a reversal of the direction of drive to the helical auger 32. As hereinbefore described, at each feeding station the feed line is provided with an opening 43 through which the feed drops into the feed pan suspended beneath the opening by feed guide 15. Interposed in the path of the feed is a chamber 44 formed by the inner walls of cylinder 45 supported to the feed line by extensions 46 and 47. The upper end of cylinder 45 is open to receive feed passing through the opening 43, while the lower end is maintained either in an opened or closed position by an auger actuated valve 48.

Valve 48 may be of the butterfly type comprising a plate 49 adapted to be swung between an open and a closed position. To this end, plate 49 is secured to rod 50 which extends through cylinder 45 and is biased closed by spring 51. One end of spring 51 is fastened to hook 52 formed at one end of rod 50, while the other end of spring 51 is fastened to another hook portion 53 formed at the end of rod 54 which is conveniently supported in suitable openings in extensions 46 and 47, feed line 11 and feed guide 15.

Actuation of valve 48 is effected through an actuating arm 55 pivotally supported on rod 54. The lower end of arm 55 is slotted as at 56 for engagement with a U-shaped portion 57 intermediate the ends of rod 50. The other end of actuating arm 55 is provided with a reverse bend and twisted at its extreme end to provide a flat end portion 58 which is positioned for engagement by the threads of the helical auger 32.

In operation, assuming that feed has just been distributed to the various feeding stations, each of the valves 48 will be in their open position. As the motor 33 is energized, the helical auger 32 is driven to convey a fresh supply of feed the entire length of the feed line. The threads of the auger engage each of the flat ends 58 of each actuating arm 55 and cause the actuating arm to be swung in a clockwise direction thus closing each valve 48 as its plate 49 is swung to a horizontal position. It is also apparent from the disclosure that the invention contemplates a counterclockwise motion of the arm 55 to achieve feed control if the mechanism is reversed. Some of the feed conveyed along the feed line drops into the closed chamber through each opening 43 until each chamber is filled and the remainder continues to be carried along the length of the feed line. The feed is conveyed past each feed station until a sufficient feed buildup occurs in the feed line which actuates switch 37 which is electrically connected to motor 33 so as to permit reversing the drive to the helical auger. This in turn causes the threads of the helical auger to engage the opposite side of the flat end portions 58 of each actuating arm 55 at each feeding station to swing the actuating arms in a counterclockwise direction. This opens each chamber 44 simultaneously so that the feed begins to drop into the feed pans. It should be readily apparent that the amount of feed dropping through each chamber is equal to the amount which was carried by the helical auger between that feeding station and the next upstream station.

Figure 6:
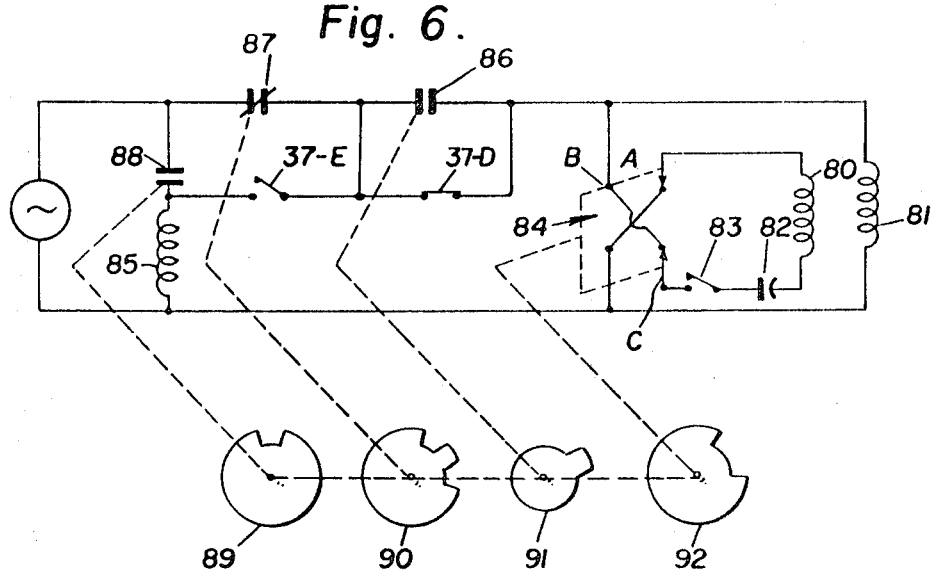
FIGS. 6 and 7 are diagrammatical illustrations of alternative arrangements of control circuits for energizing the poultry feeder of the present invention.
Figure 7:
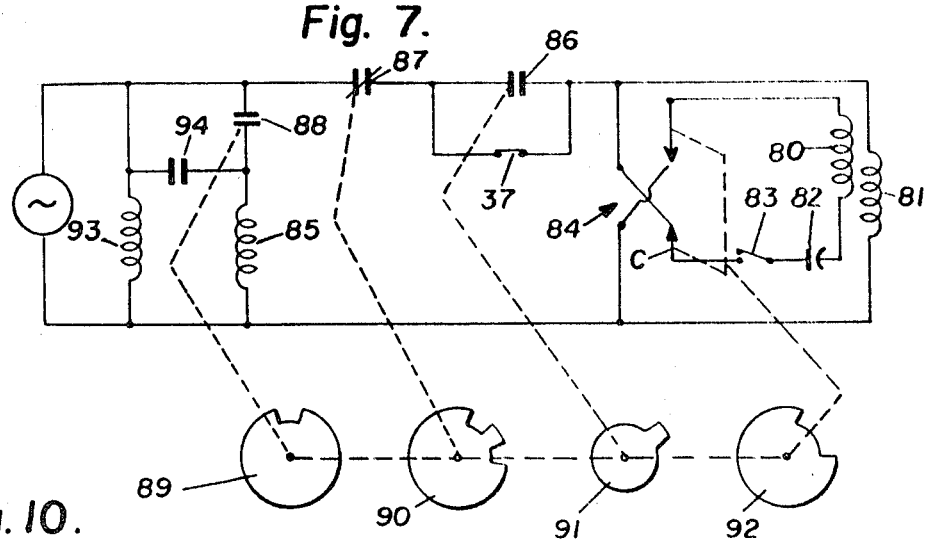

FIGS. 6 and 7 illustrate alternate forms of energizing circuits for the auger drive motor 33 and include a timer for providing automatic distribution of the feed to the feeding stations at predetermined intervals.

Referring to FIG. 6, the motor 33 for driving the helical auger is a conventional single phase AC capacitor start motor having a start winding 80 and run winding 81 and is connected to the helical auger through a conventional gear reduction unit. The start winding 80 is connected through capacitor 82 and a conventional speed kick-out start switch 83 across the forward-reverse contacts of switch 84. Reversal of drive to the helical auger is effected by reversing the phase excitation of the start winding 80 with relation to that of the running winding by switching the movable contacts C of switch 84 from position A to position B after the motor has been stopped. Switching of contact C is effected through a suitable cam driven by timer motor 85.

The run winding 82 of motor 33 is connected in series with cam actuated switch 86 shunted by the normally closed contacts D of feed-level switch 37 and through cam actuated switch 87 to the AC supply. The normally open contacts E of feed-level switch 37 are connected in series with the energizing winding of timer 85 and through switch 87 to the AC supply. Timer 85 may also be energized through its own cam actuated switch 88.

Timer 85 is a conventional timer having a preselected output of one revolution per 15 minutes and includes a plurality of cams 89—92 mounted on its shaft for actuation of switches 84, 86, 87 and 88 in a predetermined sequence. For clarity, the profile of cams 89—92 are illustrated in FIG. 12 and each of the corresponding switches actuated by each cam are connected by dashed lines.

In operation, with timer 85 in its home position, motor 33 is energized through contacts 37D and switch 87 to run in a forward direction for conveying feed along feed line 11. Upon actuation of feed level switch 37, contacts 37D are opened while contacts 37E are closed thus energizing the timer and removing excitation to the motor. Cam 89 closes the energizing circuit to the motor to complete the cycle regardless of the state of the feed level switch 37. Cam 90 serves to open the motor circuit twice to avoid reversing from full speed, and cam 91 closes contacts 86 to assure that the motor will reverse regardless of the position of the feed level switch. Cam 92 operates switch 84 and causes the motor to reverse for a fixed period. Upon completion of the cycle, the timer returns to its home position and drive motor 33 is again energized to run in the forward direction until feed level switch 37 is again actuated, thus making the feeding process completely automatic.

FIG. 7 is an alternate energizing arrangement in which the motor may be energized in timed cycles to regulate the feeding periods. To this end, switch 37 is a normally closed single pole, single throw switch and a cycle initiate timer 93 is connected in series with the energizing winding of timer 85. The cycle initiate timer may be set for as many cycles as desired so long as the time interval between cycles is sufficient to allow the feed line to be filled completely and starts the cycles each time its contacts 94 close.

In another modified form of construction a wire 95 extends the full length of the feed line 11. Wire 95 is supported slightly above the feed line by plates 96 and 97 mounted at opposite ends and serves the purpose of preventing birds from roosting on the feed line. If desired, wire 95 may be supplied with a low electric voltage in a manner well known in the art in order to impart a mild electric shock to any birds attempting to roost on the feed line or wire. Such an arrangement is particularly advantageous where the feed line is open at the top as shown in FIG. 1.

It should be apparent that the present invention is capable of a variety of modifications. For example, as shown in FIG. 8, feed line 11 may be formed from a closed pipe of circular cross section. Such an arrangement avoids the problem of birds attempting to reach the feed from between the trackway 23.

In this form of the invention, feed sensing switch 37 is conveniently supported over a suitable opening (not shown) provided in the feed line to permit its actuating arm 41 to extend therein for actuation upon a buildup of feed in the feed line in the manner hereinbefore described.

Because the weight of the feed line is not uniform along its length, particularly at the ends where the motor 33 and feed hopper 10 are supported, there may advantageously be provided additional spaced support means on the floor which cooperate with the overhead supports to relieve a portion of the load at the heaviest places. To this end, as shown in FIG. 8, feed line 11, is provided with a plurality of suitable sleeve members having upstanding brackets 98 each rotatably supporting a pulley 99. Each of the brackets 98 is adjustably supported within a slotted frame member 100 and the lower portion of the bracket 98 is provided with pins 101 for engaging one of several slots 102 provided on the frame 100. Each of the pulleys 99 is supported by a riser cable 103 which, in turn, is supported by a double pulley member 104 suspended from the ceiling by suitable means. As shown in FIG. 8b, an alternate embodiment of the bracket structure is shown. The bracket 98′ rotatably supports a pulley 99′ and the depending arms of the bracket are provided with a series of apertures 102′. The bracket 98′ engages a supporting ring 100′ which extends around the bottom of the feed line 11 and is provided with outwardly extending portions for engaging aligned apertures in the bracket 98′. As shown, one end of the riser cable 103 extends around the upper pulley of member 104 and is clamped by suitable means to the master cable. The other end of the riser cable 103 is similarly clamped to the master cable and extends around the lower pulley of member 104 and has affixed thereto a clamp member 105 which acts as a stop for the riser cable in this position. Between the clamp member 105 and the clamp on the master cable 27 the riser cable 103 is allowed sufficient slack to take up the lateral movement of the master cable.

The master cable 27 is connected to a booster pulley 106 which, in turn, is supported by a winch cable 107 extending from a double lag bracket 108 and around a pulley 109 as shown. With this arrangement, the booster pulley 106 acts to divide the load on the winch 31. In addition, the master cable 27 is provided with a riser cable 110 for the hopper 10. The cable 110 is clamped to the master cable 27 near the booster pulley 106, as shown, and extends around a pulley member 111 and is connected to a supporting frame structure 112 for the hopper 10. A similar supporting frame structure 112' is provided at the other end of the feeder for supporting the motor 33, as shown.

As shown in FIG. 9, the supporting structure 112 consists of a parallel pair of channel-type bar members 113 which pivotally support by suitable pin means a U-shaped bracket 114 in which is cradled the hopper 10. The bar members 113 are pivotally supported at each of their respective ends by a stand 114. The other ends of the bar members 113 are connected by a yoke member 115 which, in turn, is connected to the riser cable 110.

Because of the pivotal connection between the bar members 113 and the stand 114, the feeder 11 can be raised or lowered while the supporting frame structures 112, 112' are resting on the ground. In this way, the supporting frame structures provide a load dividing function, since the load of both the hopper 10 and motor 33 is positioned half way between the pivotal ends of the bars 113 and the yoke member 115. The load, then, only moves a portion of the distance, in this case a half of the distance, that the yoke 115 is moved by the riser cable 110. In addition, the entire feeder including the supporting frame structures can be raised into a storage position adjacent the ceiling. For this latter purpose the top of the hopper 10 is removable.

Figure 10:
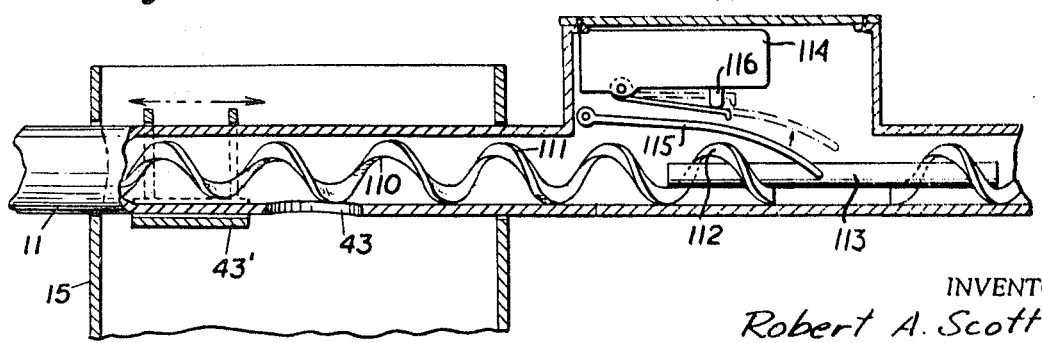
FIG. 10 is a fragmentary, side elevational view, partially in cross section, of an alternate embodiment of the present invention illustrating the separated thread auger arrangement for actuating a programming switch.

Referring to FIGS. 10 and 11, there is illustrated another embodiment of the present invention wherein the feeder may be programmed to run at desired intervals. In this embodiment, one revolution of auger 116 is broken away so that there is a discontinuity in the threads. Adjacent threads 117 and 118 at the point of discontinuity are connected by rod 119. A feed sensing microswitch 120 is positioned preferably between the last and penultimate feed station with its pivoted sensing lever 121 disposed between threads 117 and 118 so as to actuate the switch contacts 122 upon a buildup of feed in the feed line. Feed sensing switch 120 has its contacts 122 connected electrically in parallel with contacts 123 of timer 124 which is, in turn, electrically connected across a power source. Both sets of contacts are connected in series with the power source and the main drive motor 125 so that the motor will be energized when either of the switch contacts is closed.

Timer 124 is a standard commercial item which can be adjusted to close the circuit at selected times during a 24 hour period and to hold it closed for any preselected time. A typical adjustment would be for the timer contacts to close every hour during the feeding period of the day and to remain closed for 1 minute.

In operation, with contacts 122 of the feed sensing switch closed, motor 125 is energized to drive the auger and cause the feed to be moved through the feed line to the several feeding stations. Motor 125 will remain energized until the feed tray at the penultimate feeding station is filled, after which a feed buildup will begin at the point of discontinuity in the auger threads. This feed buildup causes lever 121 to be pushed upwardly causing contacts 122 to open thus deenergizing the motor. The motor remained deenergized until the timer contacts 123 close to establish the circuit to the motor for the short preselected period. Any feed remaining between the last and penultimate feed station is discharged into the last feed tray. Likewise, if the other feed trays are not full, any feed left in the conveyor will be discharged into a tray prior to reaching the feed sensing switch. The feed sensing switch contacts will close and remain closed after timer contacts 123 open until such time as a feed buildup occurs to push lever 121 upwardly. In cases where no feed is consumed between the times when timer contacts 123 are closed, there will always be feed pushing on lever 121 and the motor will be deenergized promptly after a short time interval.

Another embodiment of the feed pan 12 is shown in FIGS. 12 and 13. For supporting the feed pan to the feed line, a plurality of rod members 16' are shown attached to a ring member 124 which is positioned under the overhanging or lip portion defining the periphery of the feed pan 12. The ring member 124 is braced into position by depending bracket members 125 as shown. Each of the bracket members is pivotally secured to the ring member 124 such that, if it is desired to remove the feed pan 12 from its supporting structure, the brackets may be urged out of engagement with the circular ridge portion 126 on the bottom of the feed pan; the ring member 124 can then be squeezed to a small diameter by virtue of a splice provided therein and thus be removed from the feed pan. The upper portions of the rod member 16' bear against the feed guide 15 in the same manner as described with respect to the embodiment shown in FIGS. 2 and 3. However, as shown in FIG. 12, a cylindrical sheath 128 having a fixed vertical position is utilized as the biasing force in the manner that ring member 17 is utilized in the embodiment shown in FIG. 2. Adjustably secured to the lower end of the feed guide 15 and surrounding the same is a feed control ring 129 for varying the flow of feed into the pan 12. For this purpose, and as best shown in FIG. 13a, the feed guide 15 is provided with a series of vertically arranged spaced apertures 130, each aperture defining a given degree of feed flow. Extending from the control ring and in line with the apertures 130 are three spring-loaded stud members 131, each of which extends into its appropriate or corresponding aperture in the feed guide 15. Thus, varying the vertical position of the control ring with respect to the bottom of the feed pan 12 will vary the flow of feed into the pan 12. This arrangement allows for a more simple adjustment of feed control in that the pan 12, unlike the embodiment shown in FIG. 2, need not be adjusted as an entire unit with respect to the feed guide 15.

A further embodiment of the feed pan 12 is shown in FIGS. 14—16, wherein the feed control ring 129 is adjustably supported by three of the rod members 16' which extend downwardly from the cylindrical sheath 128 and outwardly from the feed guide 15. Each of these rod members 16' is provided at its lower depending end with a right angle portion 132 for insertion into one of a plurality of apertures 133 located on the feed control ring 129. The apertures 133 are arranged in a line which is angled with respect to the horizontal for the purposes of offering finer vertical adjustment of the control ring 129. The circular ring member 124 supporting rod members 16' is maintained under the overhang, or lip, of the feed pan 12 by means of brace members 134 as shown. The brace members 134 may be urged upward along the rod members upon which they are journaled and the ring member 124 may then be removed from the feed pan 12 in the manner above described.

There is thus provided by the present invention an improved automatic poultry feeder for distributing equal quantities of feed to a plurality of feeding stations so as to provide fresh, clean feed of uniform mixtures to all feeding stations along the length of the feed line. Although the invention has been described with reference to several variations, it will be readily apparent to those skilled in the art that various other modifications may be made without departing from the inventive concept. It is therefore intended by the appended claims to cover all such modifications which fall within the scope of the invention.

That which we claim is:

1. In a feeding device comprising, a horizontally disposed feed line having a plurality of spaced opening defining a plurality of spaced feeding stations, a vertical feed tube depending from each of said stations, a feed pan extending below said feed tube and having circumferentially arranged rod means connecting the periphery of said feed pan to said feed tube for defining an adjustable space between the lower end of said feed tube and the bottom of said feed pan, a feed control ring member spaced from and surrounding said feed tube and having a plurality of apertures for adjustably supporting said feed control ring member for varying the distance between the bottom of said ring member and the bottom of said feed pan, and extended portions of said rod members for engaging selected ones of said apertures.

2. In a device according to claim 1, a sheath surrounding said feed tube and defining therewith an annular space holding portions of said rod members therein.

3. In a device according to claim 2, said rod members having a vertical portion held in said annular space, an upper portion extending therefrom and holding said feed pan and a lower portion extending therefrom and engaging said control ring.

4. In a device according to claim 3, said lower portion extending downwardly and having upwardly angled end portions engaging said apertures.